(No Model.)

C. GERBER.
SOD CUTTER AND CULTIVATOR COMBINED.

No. 339,401. Patented Apr. 6, 1886.

WITNESSES
INVENTOR
Charles Gerber
By C. M. Alexander
his Attorney

UNITED STATES PATENT OFFICE.

CHARLES GERBER, OF YORK, PENNSYLVANIA, ASSIGNOR OF THREE-FOURTHS TO LEWIS C. ERWIN AND JOHN H. THOMAS, BOTH OF SAME PLACE.

SOD-CUTTER AND CULTIVATOR COMBINED.

SPECIFICATION forming part of Letters Patent No. 339,401, dated April 6, 1886.

Application filed July 2, 1885. Serial No. 170,515. (No model.)

*To all whom it may concern:*

Be it known that I, CHARLES GERBER, a citizen of the United States, residing at York, in the county of York and State of Pennsylvania, have invented certain new and useful Improvements in Sod-Cutters and Cultivators Combined, of which the following is a specification, reference being had therein to the accompanying drawings.

This invention relates to sod-cutters, pulverizers, and cultivators, and it has for its object the cutting and tearing to pieces of sod over which it may be passed, as also the pulverizing of clods, and of general cultivation where it can be used. This is accomplished by the use of cutters and hooks and cleaners placed upon a shaft and revolved at good speed or very rapidly, thereby giving many cuts to each revolution of the traction master-wheels.

Figure 1:
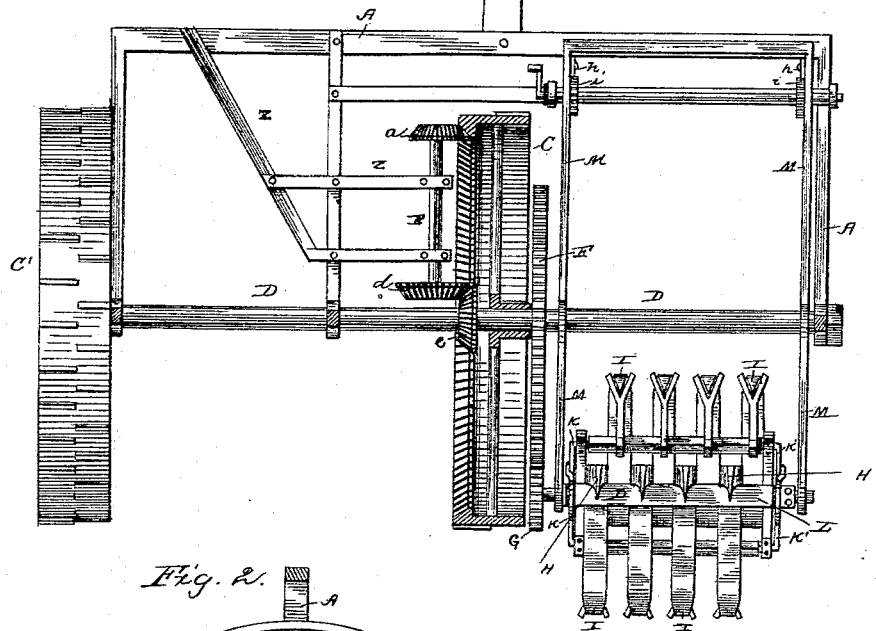
Figure 2:
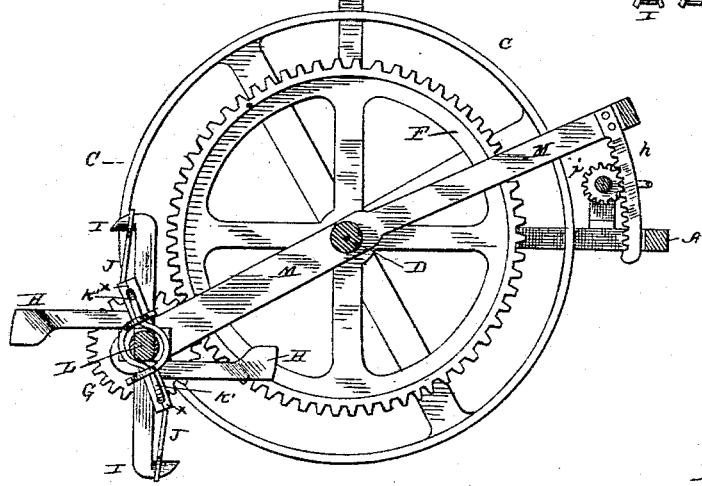
Figure 3:
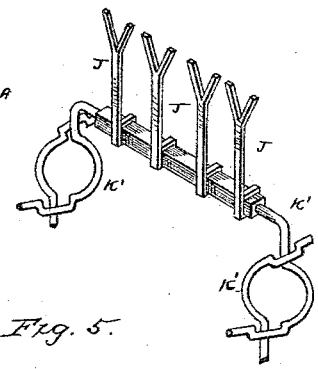
Figures 4, 5:
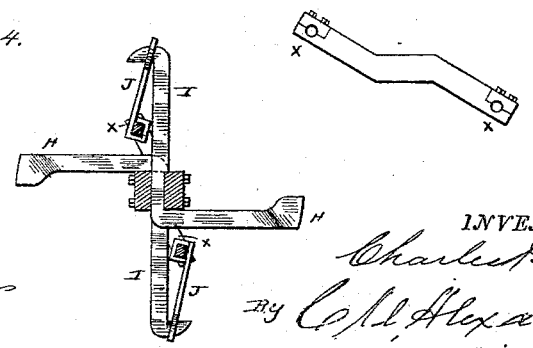

In the annexed drawings, making part of this specification, Figure 1 represents a plan view of the machine with one wheel in section. Fig. 2 is a side elevation of a portion of the machine, one end of the main frame being removed to show the cutters and their frame. Fig. 3 is a perspective of one of the clearers. Fig. 4 is a side view of the cutters and hooks, partly in section. Fig. 5 shows the clamps for the clearer-shaft.

In the figures, A A represent the main frame of the machine, which may be made quadrangular or any other suitable shape and in any of the well-known and usual ways. This frame is supported and carried by a shaft, D, and two traction-wheels, C C'. The shaft runs loosely in its bearings in the frame, as also in the eyes of the traction-wheels.

In operation the shaft revolves.

The wheel C is provided upon a portion of its internal periphery with bevel-gear.

Upon a suitable frame, Z Z, is supported a shaft, E, upon each end of which is a bevel-wheel, *a* and *d*. The wheel *a* meshes into the bevel-gear of the traction-wheel C.

*e* represents a bevel-wheel, which is securely fastened upon the shaft D. The wheel *d* gears into the bevel-wheel *e*.

F represents a gear-wheel, which is secured upon shaft D, and which gears into a smaller wheel, G, which is secured upon a shaft, L, which carries the cutters. When the traction-wheel C moves, it revolves through wheels *a* and *d*, the wheel *e*, and consequently the shaft and wheel F, which in turn revolves wheel G and the cutter-shaft, with its cutters. The progressive gearing seen here gives a rapid motion to the cutters and hooks, so that the cuts or actions upon the sod or earth are very close together, possibly not over an inch or two apart. This of course will pulverize the clods and earth, and in sod ground will tear the sod into shreds.

M represents the frame which carries the shaft of the cutters. The shaft D passes loosely through this frame near its center.

L represents the cutter-shaft, and H H the cutters, and I I the hooks, which are secured upon said shaft. The cutters, as well as the hooks, are formed upon metallic bars, which are bent at right angles, as seen in Fig. 4, a cutter and hook upon each bar. These bars are clamped alternately upon the shaft L, so that the path of one is between that of the other. I will use as many of these arms as the power will drive.

The clearers J J consist of a series of pronged arms secured upon a suitable shaft, K, said shaft having its bearings in arms *x x*, which project from the cutter-shaft. The prongs of the arms embrace the hooks, as seen clearly in Fig. 1. The ends of shaft K are curved in such manner that the end of the shaft on one side will operate that upon the other. They automatically operate, and thus serve to keep the hooks from becoming clogged with grass or trash.

*h* represents a rack-bar upon the end of the frame M, and *i* a pinion, which plays in it, for the purpose of regulating the depth of cut of the cutters, as also for elevating the cutters when it is desired to move the machine.

The operation of this machine will be fully understood from the foregoing description.

Having thus fully described my invention, what I claim as new, and desire to secure by Letters Patent, is—

1. Combined with a series of cutters and hooks mounted on a shaft, a series of clearing-arms mounted on shafts, coinciding with the hooks, said shafts having their ends encircling the cutter-shaft and engaging one with the other, to cause a simultaneous movement, substantially as and for the purpose specified.

2. A combined hook and cutter for cultivators, consisting of a right-angle bar having the end of one arm bent into a hook, and the end of the other arm formed into a cutter, substantially as and for the purpose specified.

3. A cutter-head for cultivators, consisting of a series of cutters and a series of hooks mounted alternately upon the same shaft, substantially as and for the purpose specified.

4. Combined with the cutter-head, a driving gear for the same, consisting of a main drive-wheel with an internal gear, an axle or shaft turning loosely in said drive-wheel, a bevel-gear thereon, a shaft carrying bevel-gears intermeshing with the gear on the drive-wheel and the gear on the axle, a large gear on the axle, and a small gear on the cutter-shaft, with which the large gear meshes, substantially as and for the purpose specified.

In testimony whereof I affix my signature in presence of two witnesses.

CHARLES GERBER.

Witnesses:
CHAS. D. DAVIS,
WILLIAM H. GASS.